H. ALLEN, Jr.
Churn.
No. 46,766.
Patented March 14, 1865.
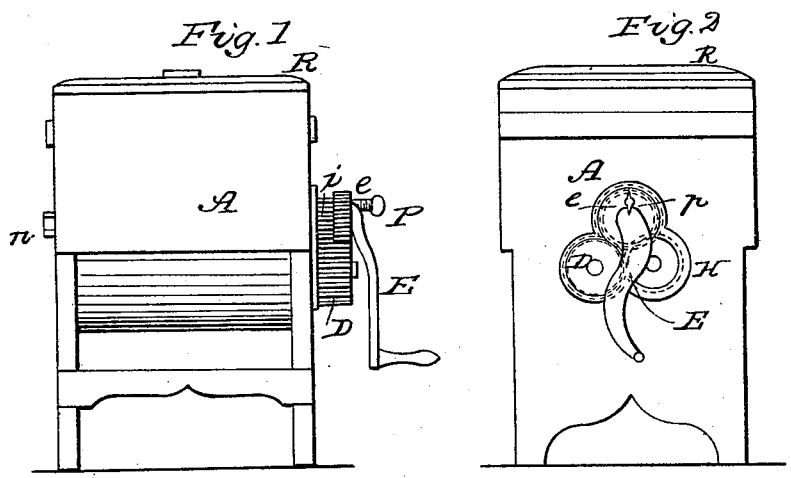
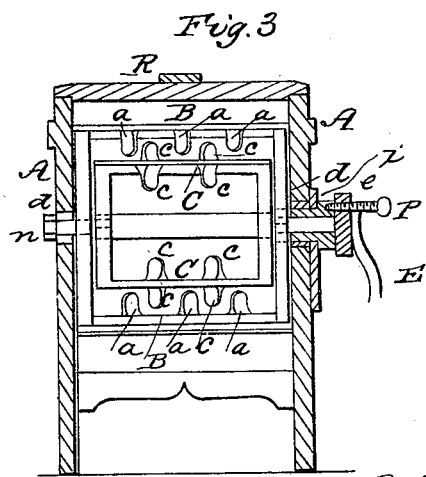

UNITED STATES PATENT OFFICE.

HIRAM ALLEN, JR., OF WALLINGFORD, CONNECTICUT.

IMPROVEMENT IN CHURNS.

Specification forming part of Letters Patent No. 46,766, dated March 14, 1865.

*To all whom it may concern:*

Be it known that I, HIRAM ALLEN, Jr., of Wallingford, in the county of New Haven and State of Connecticut, have invented a new and useful Improvement in Churns; and I do hereby declare the following to be a full, clear, and exact description of the same, when taken in connection with the accompanying drawings and the letters of reference marked thereon, and which said drawings constitute part of this specification, and represent, in—

Figure 1, a side view; Fig. 2, an end view, and in Fig. 3 a longitudinal vertical central section.

My invention relates to improvements in that class of churns in which there are two sets of beaters to revolve, each in opposite direction to the other; and it consists, first, in the construction of the beaters; and, secondly, in connecting the two sets of beaters so that they may both be made to revolve together in the same direction at the pleasure of the operator.

To enable others skilled in the art to construct and use my improved churn, I will proceed to fully describe the same as illustrated in the accompanying drawings.

I illustrate my beaters as placed in an ordinary box or cylinder churn, A. B is the outer, and C the inner, set of beaters, each fixed to its own shaft (one within the other, as usual for similar beaters) and revolving in proper bearings, $d$ $d$. The outer set, B, consists of a frame, in the horizontal bars of which are fixed three (more or less) flukes, $a$ $a$, set spirally, as seen in Fig. 3. In the other set, C, are fixed similar flukes, $c$ $c$, upon both sides of the horizontal bars, as seen in Fig. 3, and set so as to pass between the flukes on the bar B and spirally in the opposite direction. A cog-wheel, $e$, is fixed to the shaft of the outer set, B, to which the crank E is attached to drive the beaters. A similar wheel, $i$, of smaller diameter, is fixed to the other set, C. A third wheel, D, working into wheel $i$, communicates motion through a fourth wheel, H, to the second set of beaters, C, by which arrangement of wheels, when the crank is turned, the two sets revolve in opposite directions to each other, in similar manner to all this class of churns. The flukes, arranged as described, in combination with the horizontal beaters B and C, serve to agitate the cream sufficiently at a much less velocity of revolution than can be done with the beaters without the flukes.

When the cream is changing and the butter formed, the two sets of beaters revolving in opposite directions tend to hinder the collection of the butter. It is customary, therefore, in churns of this description (double beaters) to remove the beaters and collect the butter by hand—a laborious process. By the introduction of the second part of my invention this difficulty is entirely overcome, and in the following manner: I remove the third wheel, D, and by means of a screw or catch, P, (seen in Fig. 3,) I confine the two wheels $e$ and $i$ together, so that they will both revolve in the same direction, carrying the beaters also in the same direction, by which arrangement the butter is readily collected into rolls or masses. By removing the screw P and replacing the wheel D the beaters will operate as before.

To remove the beaters from the churn for the purpose of cleansing, &c., remove the cover R, unscrew the nut $n$, and withdraw the shafts, when the beaters may be taken from the cylinder.

Therefore, having fully described my invention, what I claim as new and useful, and desire to secure by Letters Patent, is—

The combination of flukes $a$ and $c$ with beaters B and C, when constructed and arranged substantially as herein set forth, so as to revolve in either the same or opposite directions.

HIRAM ALLEN, JR.

Witnesses:
JOHN E. EARLE,
RUFUS SANFORD.